June 11, 1946.   H. I. SCHUSTER   2,401,971
PRECISION CHUCK
Filed Aug. 24, 1944   2 Sheets-Sheet 1

INVENTOR
HARRY I. SCHUSTER
BY
Wheeler, Wheeler & Wheeler
ATTORNEYS.

June 11, 1946.  H. I. SCHUSTER  2,401,971
PRECISION CHUCK
Filed Aug. 24, 1944  2 Sheets-Sheet 2

INVENTOR
HARRY I. SCHUSTER.
BY Wheeler, Wheeler & Wheeler
ATTORNEYS

Patented June 11, 1946

2,401,971

UNITED STATES PATENT OFFICE 2,401,971

PRECISION CHUCK

Harry I. Schuster, Milwaukee, Wis.

Application August 24, 1944, Serial No. 550,914

5 Claims. (Cl. 279—123)

This invention relates to improvements in precision chucks.

The invention has particular reference to the type of chuck in which a number of jaws are simultaneously actuated radially to and from work-engaging jaws, as by a pneumatic cylinder and piston. In such devices, a precise adjustment of the respective work-engaging jaws is essential in order that the several jaws may simultaneously engage and release the work and precisely support it exactly on center.

It is the primary object of the present invention to provide novel and improved means for adjusting the work-engaging jaw of such a chuck with respect to its carrier or master jaw.

The objects of the invention will be more specifically apparent to those skilled in the art on the basis of a study of the following disclosure.

In the drawings.

Like parts are identified by the same reference characters throughout the several views.

Figure 1:
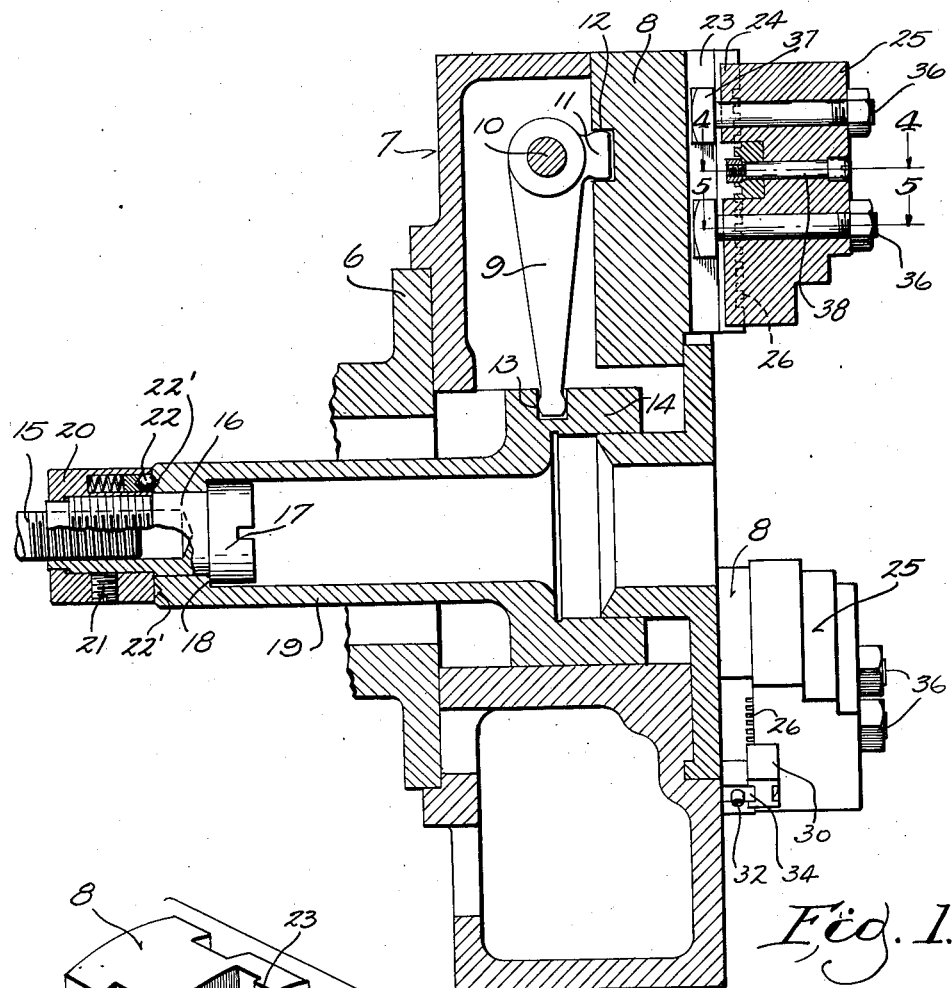
Figure 1 is an axial section through a chuck embodying the invention.

Many of the parts shown are conventional and, hence, will be but briefly described. There is illustrated at 6 a work spindle upon which the chuck head 7 is mounted in the usual manner. The chuck head 7 provides guideways in which the carriers or master jaw elements 8 are radially adjustable. In the device illustrated, three such carriers are shown. They are simultaneously reciprocated radially along their respective guideways by means of bellcranks within the head, one of which is illustrated at 9, pivoted for oscillation upon a pintle 10 and provided with an arm 11 engaged in the notch 12 of the carrier or master jaw 8, shown in Fig. 1.

The longer arm of the bellcrank 9 extends centrally into engagement with notch 13 of the spindle 14, which is reciprocable axially of the spindle 6, under the control of a threaded rod 15, which may be connected with a suitable pneumatically operated piston (not shown). For adjustments affecting the range of operation of all of the several jaws 8, a tubular nut 16 is provided in threaded engagement with the end of the rod 15, such nut having a slotted head 17, accessible through the center of the chuck for adjustment of the nut. The head 17 sets against a shoulder at 18 in the sleeve portion 19 of the bellcrank actuator 14. A collar 20 is held by the set screw 21 on the nut 16 in thrust engagement with the end of the sleeve 19. A spring-pressed detent, including a ball 22, selectively engages in pockets 22' in the ends of the sleeve 19 in the various positions to which the nut may be adjusted.

The outer face of each of the master jaws or carrier members 8 is provided with a guideway comprising a T-slot 23 for the spline 24 of the work-engaging jaw elements 25. Thus, any adjustment between the work-engaging jaw 25 and the master jaw 8 must be effected solely in a radial direction.

Figure 2:
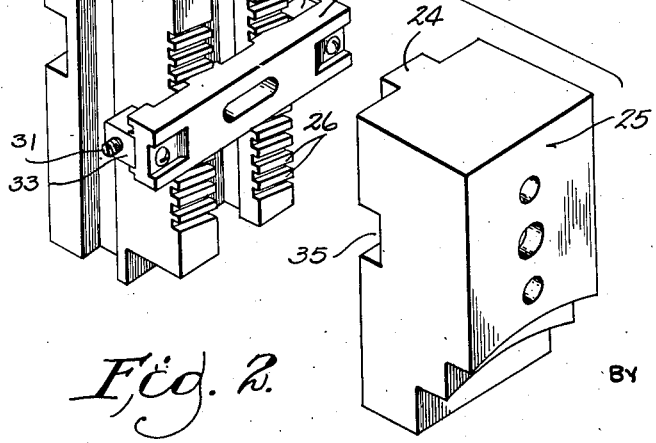
Fig. 2 is a detail view in perspective of the master jaw and the work-engaging jaw, and the key by which accurate adjustment of the relation between these parts is effected.
Figure 3:
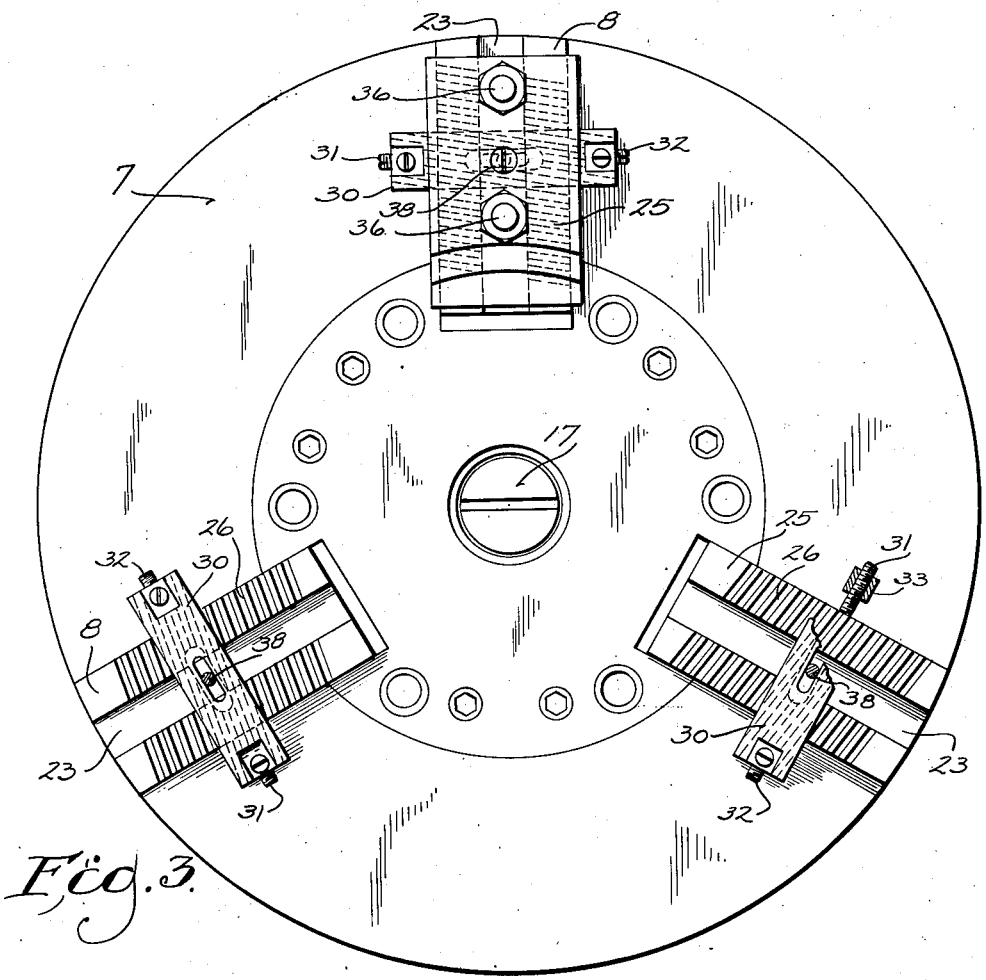
Fig. 3 is a front elevation of the assembly shown in Fig. 1, portions of the work-engaging jaws being broken away to expose the means for adjustment.
Figure 4:
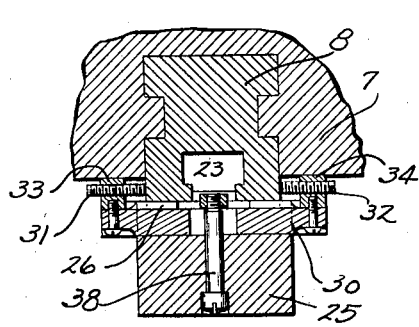
Fig. 4 is a fragmentary detail view taken in section on the line 4—4 of Fig. 1.
Figure 5:
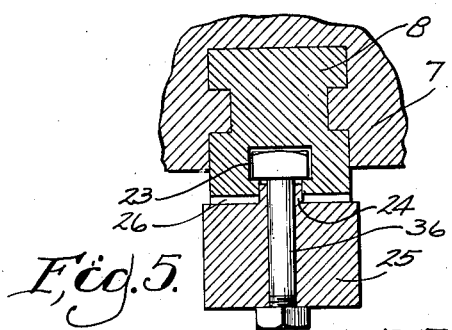
Fig. 5 is a fragmentary detail view taken in section on the line 5—5 of Fig. 1

At either side of the T-slot 23, the outer face of the master jaw is provided with a series of serrations or threads 26 inclined obliquely with reference to the radial T-slot 23. A key member 30 disposed transversely of the face of the master jaw member 8 has complementary obliquely disposed teeth meshing with the teeth of the master jaw. The key member 30 is preferably at right angles to the radius of the chuck. The key member 30 may be applied to the face of the master jaw at any desired point to mesh with any selected teeth thereon. The pitch of the teeth is such that, by moving the key member from right to left across the face of the master jaw, it may be made to receive radial movement equal to the displacement or pitch distance between successive teeth. The adjustment of the key member 30 transversely with the master jaw is effected and maintained by set screws 31, 32, threaded in the lugs 33, 34, which are bolted to the key member and which bear against the side faces of the master jaw, as clearly shown in Figs. 2 and 4.

The key member fits into a transverse guideway 35 on the false jaw 25 so that any movement of the key member in a direction radial of the chuck is imparted to the work-engaging jaw 25 to cause such jaw to move laterally of the chuck. One or more clamping bolts 36 hold the false jaw releasably in adjustment. Each clamping bolt has a nut 37 in the T-slot 23. A separate bolt 38 preferably connects each work-engaging jaw 25 to its respective key 30, the key being slotted to permit of relative movement. By loosening the bolts 36 and 38 and, thereupon, one of the set screws 31, 32, and tightening the other set screw, an extremely precise radial adjustment of the false jaw 25 may be made, the precision being due to the fact that in each turn of any one of the set screws, a very slight lateral movement of the key is brought about and this, in turn, causes an even more minute radial movement of the false or work-engaging jaw. When the work-engaging jaws have been precisely adjusted to hold the work exactly centered on the chuck, the bolts 36 and 38 are tightened.

In setting up the chuck to receive a given piece of work, the keys 30 are so meshed with the threads of the respective master jaws as to approximate the true positions at which it is desired to carry the false jaws. The bolts 38 hold the keys to the false jaws, thereby enabling unitary manipulation with the work-engaging jaws and the keys in approximately the desired location. The final adjustment is made by adjusting the respective keys individually in lateral directions whereby the oblique pitch of the threads 26 will occasion the requisite minute adjustments of the work-engaging jaws 25 to the precise position desired. With the several parts locked in adjustment, the movement of the work-engaging jaws will thereafter be controlled through the bellcranks and the master jaws in the ordinary way.

It will be understood by those skilled in the art that the interacting surfaces of the teeth of the key and the master jaw act as cam surfaces in effecting movement of the false jaw to a position corresponding to the adjustment of the key in a transverse direction. Moreover, I have in mind that it is broadly immaterial which of the jaws is provided with the slot or guideway 23 and which with the spline 24. It is also broadly immaterial which of the jaws is provided with a keyway and which has the obliquely disposed cam surfaces or teeth with which the corresponding surfaces of the key are engaged.

I claim:

1. In a chuck, the combination with a master jaw having guide means and a false jaw reciprocable along said guide means to and from work-engaging positions, one of said jaws being provided with a keyway and the other with a surface obliquely inclined respecting said guide means, a key interposed between the said jaws and disposed in said keyway and having a surface complementary to the oblique surface aforesaid, and means for adjusting the key transversely and for fixing its position in such adjustment whereby to effect and fix relative longitudinal adjustment between said jaws.

2. In a chuck, the combination with a master jaw having a guide slot and teeth disposed obliquely respecting said slot, of a false jaw reciprocable along the guide slot and provided with a transverse keyway, a key in the keyway having teeth complementary to the oblique teeth of the master jaw and meshed therewith, and means for moving the key transversely of the master jaw and fixing its position in such adjustment in the keyway of the false jaw whereby to effect adjustment of the false jaw along the guide slot of the master jaw.

3. In a chuck comprising a chuck head, a plurality of master jaws reciprocable radially of said head, and means for reciprocating the several master jaws in unison, the combination with a master jaw provided with a generally radial guide means, of a false jaw in splined connection with said guide means for generally radial movement respecting the master jaw, means for releasably clamping the said jaws in relative adjustment, and means effective upon the release of said clamping means for minutely adjusting the false jaw upon the master jaw along said guide means, the minutely adjusting means comprising a key, screw means for moving the key in a direction transverse respecting said guide means, one of said jaws being provided with a slot in which said key is positioned and the other of said jaws and said key having meshing teeth obliquely disposed respecting said key slot and guide means.

4. In a device of the character described, the combination with two relatively reciprocable jaws, one of which is provided with a slot and the other with a spline fitted to the slot for determining the direction of relative reciprocation, of a key disposed transversely of the slot, one of said jaws being provided with a keyway in which said key is fitted and the key and the other of said jaws being provided with complementary cam surfaces disposed obliquely respecting the keyway and the slot, and screw means for fixing the position of the key, the transverse movement of the key determining the relative position of said jaws longitudinally of the slot.

5. The device of claim 2, in which the key is provided with set screws adjustably engaged with opposite sides of the master jaw for controlling the lateral position of the key respecting the master jaw and thereby determining the position of the false jaw along the slot of the master jaw.

HARRY I. SCHUSTER.